United States Patent [19]

Niemiec

[11] Patent Number: 5,199,718

[45] Date of Patent: Apr. 6, 1993

[54] ROTARY MACHINE SHAFT SEAL

[75] Inventor: Albin J. Niemiec, Sterling Heights, Mich.

[73] Assignee: Vickers, Incorporated, Troy, Mich.

[21] Appl. No.: 867,388

[22] Filed: Apr. 13, 1992

[51] Int. Cl.$^5$ ............................................. F16J 15/32
[52] U.S. Cl. ........................................ 277/29; 277/58; 277/153
[58] Field of Search ..................... 277/2, 29, 58, 59, 70, 277/71, 153

[56] References Cited

U.S. PATENT DOCUMENTS

| | | | |
|---|---|---|---|
| 2,491,233 | 12/1949 | Vedovell | 277/29 |
| 2,818,283 | 12/1957 | Hutterer | 277/58 |
| 3,572,379 | 3/1971 | Popa et al. | 277/29 |
| 4,085,941 | 4/1978 | Wilkinson et al. | 277/71 |
| 4,174,672 | 11/1979 | Cox | 277/59 |
| 4,337,956 | 7/1982 | Hopper | 277/29 |
| 4,428,630 | 1/1984 | Folger et al. | 277/29 |
| 4,448,425 | 5/1984 | von Berger | 277/2 |
| 4,953,876 | 9/1990 | Muller | 277/176 |
| 5,105,636 | 4/1992 | Anastase et al. | 277/58 |

FOREIGN PATENT DOCUMENTS 0247517 9/1943 Switzerland ........................ 277/58

Primary Examiner—William A. Cuchlinski, Jr.
Assistant Examiner—D. DePumpo
Attorney, Agent, or Firm—Barnes, Kisselle, Raisch, Choate, Whittemore & Hulbert

[57] ABSTRACT

A rotary hydraulic machine includes a housing, a shaft carried for rotation and extending from the housing, and a shaft seal carried by the housing in sealing engagement with the shaft to prevent leakage of fluid along the shaft. The shaft seal has an annular shell adapted for mounting to the housing surrounding the shaft and radially spaced therefrom. A pair of annular resilient sealing rings are carried by the shell and extend radially inwardly therefrom into rotary sealing engagement with the shaft. A pressure relief valve includes at least one opening that extends radially through the shell between the rings, and a resilient band surrounding the shell externally of and overlying such opening. Pressure of fluid urges the band away from the shell to permit flow of fluid through the shell opening externally of the shell and band, while the band prevents entry of dirt or debris through the opening into the shell.

17 Claims, 2 Drawing Sheets

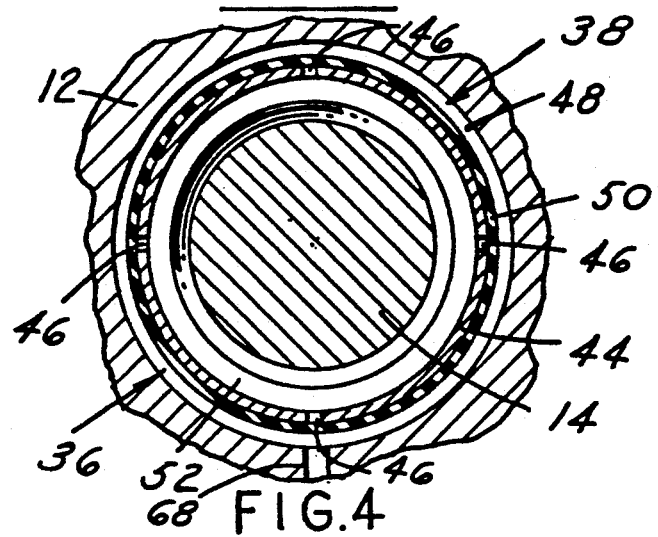
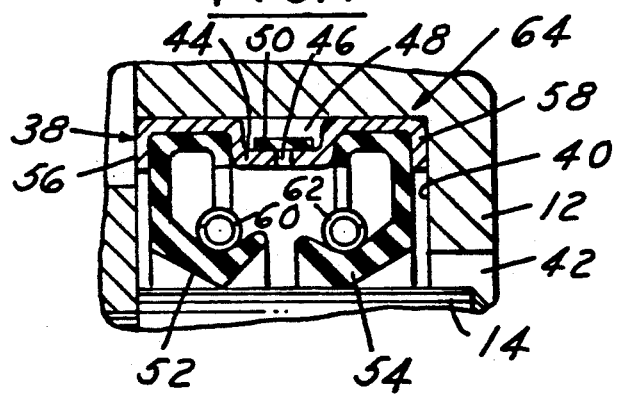
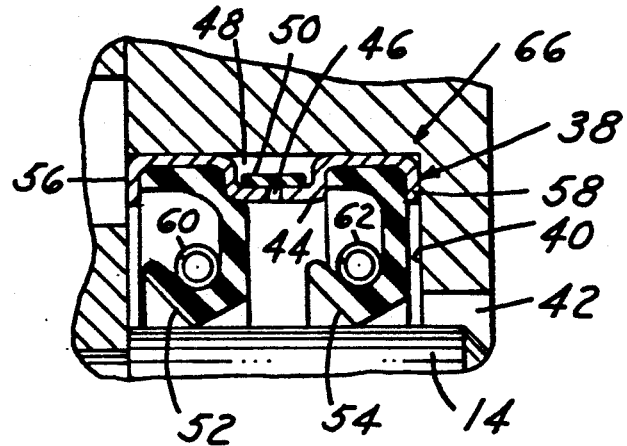

ROTARY MACHINE SHAFT SEAL

The present invention is directed to rotary machines, and more particularly to an improved shaft seal construction that finds particular utility in rotary hydraulic machines such as hydraulic pumps and motors.

BACKGROUND AND OBJECTS OF THE INVENTION

Rotary hydraulic machines such as motors and pumps conventionally include a housing, a rotatable shaft that extends from the housing for coupling to an external device, and a shaft seal within the housing surrounding the shaft for preventing leakage of hydraulic fluid along the shaft into or out of the housing. The seal conventionally includes a generally V-shaped annular resilient sealing ring or gasket having one leg urged by a garter spring into sealing engagement with the shaft. In the event of seal failure due to age or wear, etc., the fluid may leak along the shaft past the seal into or out of the housing, causing loss of fluid and potential contamination. If the pump is mounted on a transmission housing in gear box, the pump fluid could leak into the transmission, or the transmission fluid could leak into the pump.

In an effort to address this situation and provide an external indication of a need for seal repair, it has been proposed to provide a pair of annular resilient sealing rings (with garter springs) spaced from each other lengthwise of the shaft. The pair of sealing rings provide double protection against fluid leakage along the shaft. A fluid passage extends from between the seals to externally of the housing, and a pressure plug is disposed at the outer end of this passage to prevent entry of dirt. When the pressure of fluid that leaks past the first seal reaches the retention pressure of the passage plug, which may be on the order of 1 to 3 psig, the plug is upset and fluid drips from the housing for observation by a user to indicate a need for seal repair.

A general object of the present invention is to provide a shaft seal of the described character that exhibits enhanced reliability in providing pressure relief for fluid that leaks past the annular resilient seal, that provides an indication of a need for seal repair by leakage from the housing, that seals against entry of dirt and debris, and that eliminates any requirement for the passage plug as in the prior-art seal arrangement described above.

SUMMARY OF THE INVENTION

In accordance with the present invention, a rotary machine includes a housing, a shaft carried for rotation and extending from the housing, and a shaft seal carried by the housing in sealing engagement with the shaft to prevent leakage of fluid along the shaft. The shaft seal comprises an annular shell adapted for mounting within the housing surrounding the shaft and radially spaced therefrom. At least one, and preferably two, annular resilient sealing rings are carried by the shell and extend radially inwardly therefrom into rotary sealing engagement with the shaft. A pressure relief valve includes at least one opening that extends radially through the shell and a resilient band surrounding the shell externally of such opening. Pressure of fluid urges the band away from the shell to permit flow of fluid through the shell opening externally of the shell and band, while the band prevents entry of dirt or debris through the opening into the shell.

In the preferred embodiment of the invention, the band has a central depression or channel, and a plurality of circumferentially spaced openings extend through the shell within the channel. The band externally surrounds the shell within the channel. The annular resilient seals are captured in assembly between opposed sides of the channel and radially inwardly extending end flanges on the shell. Each seal comprises a V-shaped sealing ring of otherwise conventional construction with a garter spring urging one leg into sealing engagement with the shaft.

BRIEF DESCRIPTION OF THE DRAWINGS

The invention, together with additional objects, features and advantages thereof, will be best understood from the following description, the appended claims and the accompanying drawings in which:

FIG. 3 is a fragmentary sectional view taken substantially along the line 3—3 in FIG. 1; and FIGS. 4–5 are fragmentary sectional views similar to that of FIG. 2 but illustrating respective modified embodiments of the invention.

DETAILED DESCRIPTION OF PREFERRED EMBODIMENTS

Figure 1:
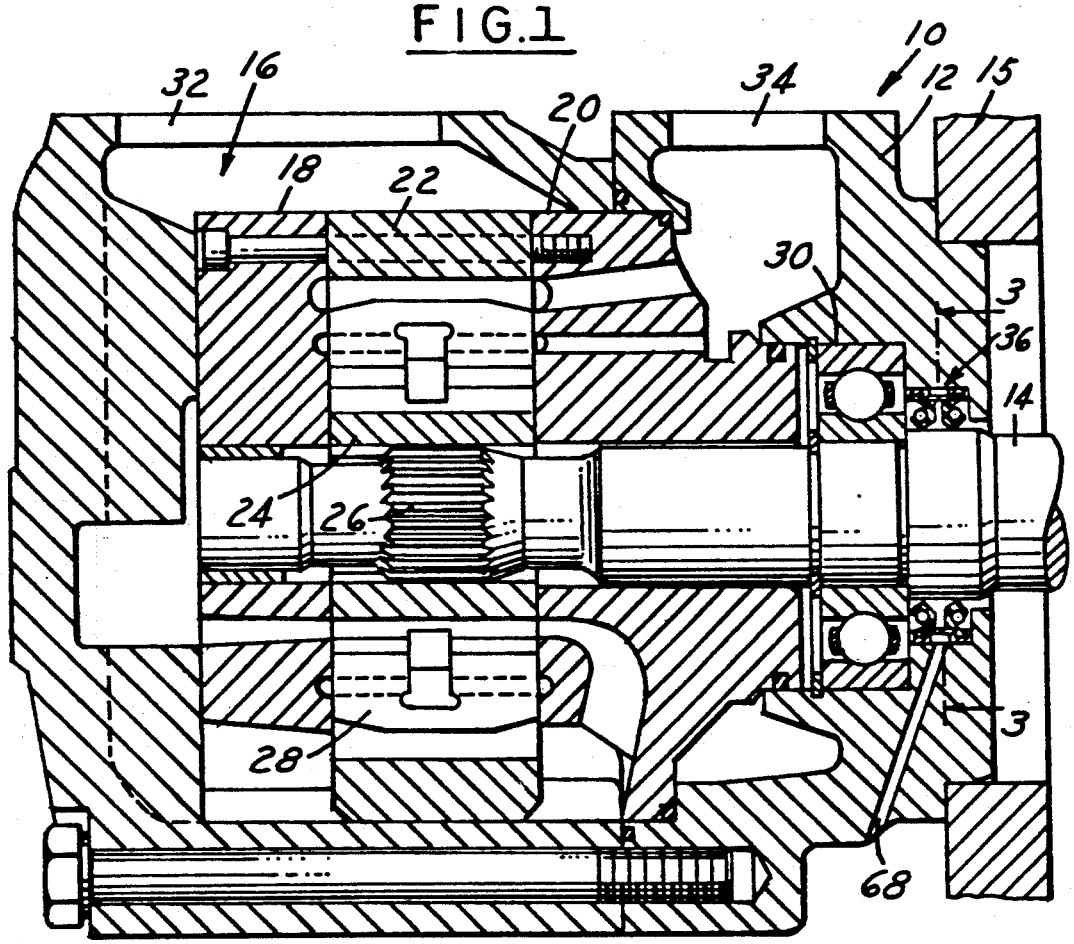
FIG. 1 is a sectional view bisecting a rotary hydraulic machine that includes a shaft seal in accordance with one presently preferred embodiment of the invention.

FIG. 1 illustrates a hydraulic vane pump 10 as including a housing 12 from which a rotatable shaft 14 projects for connection to a source of external rotary motive power, such as within a transmission housing or gear box 15 to which pump 10 is mounted. A pump cartridge 16 is disposed within housing 12, and comprises a pair of end plates 18, 20 and a cam ring 22 mounted therebetween. A pump rotor 24 is rotatably coupled to splines 26 on shaft 14, and carries a plurality of radially extending vanes 28 that engage cam ring 22 to define pumping chambers between the rotor and cam ring. A bearing 30 surrounds the shaft opening in housing 12 and rotatably supports the shaft. The housing also provides pump inlet and outlet ports 32 and 34 respectively. A shaft seal 36 is disposed at the shaft opening of housing 12 and seals against leakage from within the housing along the shaft into the gear box or transmission housing 15.

To the extent thus far described—i.e., up to the detailed description of shaft seal 36 hereinafter set forth—pump 10 is generally similar to that disclosed in U.S. Pat. No. 2,967,488, to which reference may be made for more detailed description of pump structure and operation. As will become apparent as the description unfolds, however, the shaft seal construction of the present invention is by no means limited to hydraulic vane pumps. Indeed, the shaft seal of the present invention finds utility in conjunction with any rotary shaft fluid machine in which it is desired to seal against fluid leakage along the shaft while providing for pressure relief of leakage fluid.

Figure 2:
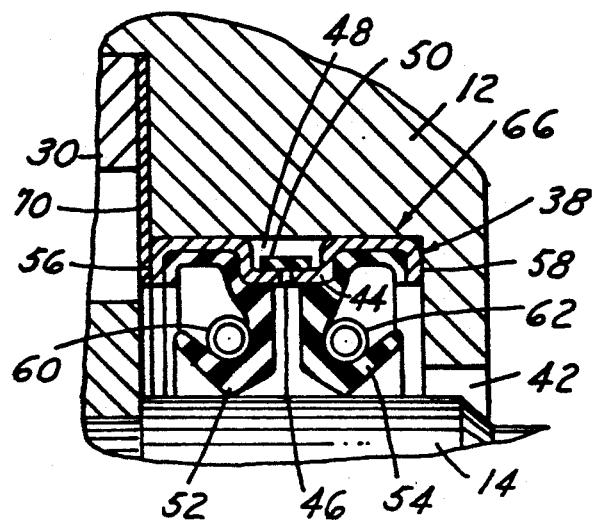
FIG. 2 is a fragmentary sectional view of a portion of FIG. 1 on an enlarged scale.

In accordance with one presently preferred embodiment of the invention illustrated in FIGS. 1–3, shaft seal 36 comprises a cartridge assembly that includes an annular shell 38 of sheet metal or other suitable rigid construction. Shell 38 has a uniform outer diameter adapted to be removably received within the housing pocket 40 that surrounds shaft opening 42 coaxially with and radially outwardly spaced from shaft 14. A central depression or channel 44 in shell 38 projects radially inwardly from the outer diameter, and is at uniform radius coaxial with shaft 14. A plurality of openings 46 are disposed in a circumferentially spaced array around shell 38, and extend radially through the body of shell 38 centrally within the annular pocket 48 between channel 44 and housing pocket 40. An elastic band 50 surrounds shell 38 and is captured in circumferential tension within channel 44 over openings 46.

A pair of generally V-shaped annular resilient sealing rings or gaskets 52, 54 are mounted within band 38. Each ring 52, 54 is contoured so as to be captured at its radially outer edge between one side of shell channel 44 and an opposing radially inwardly turned shell end flange 56, 58. A garter spring 60, 62 urges the inner edge of each ring 52, 54 into radial sealing engagement with the opposing surface of shaft 14. As is conventional, each V-shaped ring 52, 54 opens axially toward an end of shaft 14 at which fluid pressure exists above atmospheric pressure. For example, the seal construction of FIGS. 1 and 2 is suitable for use in applications where fluid pressure exists on both sides of the seal, with rings 52, 54 opening in opposed axial directions. The seal construction 64 in FIG. 4 would be suitable for use in applications where the opposing axial sides of the seal are at sub-atmospheric pressure, while the construction 66 in FIG. 5 would be suitable for use in applications where the region to the right of the seal is at atmospheric or sub-atmospheric pressure, and the region to the left of the seal is a supra-atmospheric pressure. A spacer 70 (FIG. 2) may be employed to provide a better sealing surface next to bearing 30.

In each of the seal constructions 36, 64, 66 in FIGS. 1-5, any fluid that leaks along shaft 14 past one of the sealing rings 52, 54 enters the region between the sealing rings inwardly of channel 44 in shell 38. Pressure of such fluid through shell openings 46 urges band 50 away from shell 38. When the pressure of leakage fluid through openings 46 is sufficient to overcome resilient tension in band 50, the band is urged radially outwardly away from shell 38, and the leakage fluid flows through shell passages 46 into the cavity 48 between the shell and the housing pocket. The number of openings 46 is selected to provide sufficient total area for the pressure of fluid at the openings to expand band 50 at the desired leakage pressure, such as 1 to 3 psig. Such leakage fluid then flows through the housing passage 68 (FIG. 1) to externally of the housing, where leakage of fluid from the open outer end of passage 68 indicates to an operator or technician that seal repair is required.

It will thus be appreciated that the seal construction of the present invention fully satisfies all of the objects and aims previously set forth. The elastic band 50 functions not only as a pressure relief valve for fluid that leaks along the shaft through one of the sealing rings 52, 54, but also functions as a check valve to prevent entry of dirt or debris into the region surrounding shaft 14 between the sealing rings. The shaft seal constructions of the preferred embodiments of the invention are provided in the form of self-contained cartridge assemblies that may be readily inserted into and removed from a housing pocket 40 at the time of original manufacture and during maintenance.

I claim:

1. In a rotary machine that includes a housing, a shaft carried for rotation and extending from said housing and a shaft seal carried by said housing in sealing engagement with said shaft to prevent leakage of fluid along said shaft, the improvement wherein said shaft seal comprises:

an annular shell of rigid construction adapted for mounting on said housing surrounding said shaft and spaced radially therefrom, annular sealing means carried within said shell and extending radially inwardly therefrom into self-biased rotary sealing engagement with said shaft, and pressure relief valve means that includes at least one opening that extends radially through said shell adjacent to but spaced from said sealing means, and a resilient band surrounding said shell externally of said shell and overlying said opening such that fluid pressure within said shell through said opening urges said band away from said opening.

2. The machine set forth in claim 1 wherein said shaft seal includes first and second said sealing means spaced from each other along said shaft for self-biased sealing engagement with said shaft independently of each other, said pressure relief valve means being disposed between said sealing means.

3. The machine set forth in claim 2 wherein said shell has a radially inwardly extending channel positioned between said sealing means, said at least one opening extending through said shell within said channel and said resilient band being disposed within said channel.

4. The machine set forth in claim 3 wherein said shell includes a pair of inwardly turned flanges on opposed sides of said channel, said first and second sealing means being mounted between said channel and respective one of said flanges.

5. The machine set forth in claim 4 wherein each of said annular sealing means comprises a V-shaped seal of elastomeric construction and a garter spring urging one leg of each said V-shaped seal into sealing engagement with said shaft.

6. The machine set forth in claim 5 wherein said at least one opening comprises a plurality of said openings circumferentially spaced around said shell.

7. The machine set forth in claim 1 wherein said shell has a first portion radially surrounding said annular sealing means and a second portion stepped radially inwardly from said first portion, said at least one opening extending through said second portion and said band being disposed externally of said second portion.

8. The machine set forth in claim 7 wherein said at least one opening comprises a plurality of said openings circumferentially spaced around said shell.

9. In a rotary machine that includes a housing, a shaft rotatably extending from said housing, an opening in said housing surrounding said shaft and coaxially spaced therefrom, a fluid passage extending from said opening to externally of said housing, and a shaft seal within said opening for preventing leakage of fluid along said shaft, the improvement wherein said shaft seal comprises:

an annular shell of rigid construction separate from said housing and removably received within said housing opening surrounding said shaft, first and second annular sealing means mounted within said shell spaced from each other along said shaft and extending radially inwardly from said shell for self-biased rotary sealing engagement with said shaft independently of each other, and pressure relief valve means comprising at least one opening extending radially through said shell between said annular sealing means and an elastic band resiliently surrounding said shell externally of said at least one opening such that pressure of fluid between said sealing means urges said band away from said shell to permit flow of such fluid through said at least one opening into said housing opening and thence through said passage.

10. The machine set forth in claim 9 wherein said shell has a radially inwardly extending channel positioned between said sealing means, said at least one opening extending through said shell within said channel and said resilient band being disposed within said channel.

11. The machine set forth in claim 10 wherein said shell includes a pair of inwardly turned flanges on opposed sides of said channel, said first and second sealing means being mounted between said channel and respective ones of said flanges.

12. The machine set forth in claim 10 wherein said at least one opening comprises a plurality of said openings circumferentially spaced around said shell.

13. A shaft seal cartridge assembly for use in a shaft opening of predetermined diameter, said assembly comprising:

an annular shell of rigid construction having an outer diameter to be received with said shaft opening, first and second annular resilient sealing means spaced from each other and mounted within said shell for self-biased rotary sealing engagement with a shaft independently of each other, at least one opening extending radially through said shell between said sealing means, and an elastic band resiliently surrounding said shell in elastic tension externally of said shell and overlying said at least one opening.

14. The assembly set forth in claim 13 wherein said shell has a radially inwardly extending channel positioned between said sealing means, said at least one opening extending through said shell within said channel and said resilient band being disposed within said channel.

15. The assembly set forth in claim 14 wherein said shell includes a pair of inwardly turned flanges on opposed sides of said channel, said first and second sealing means being mounted between said channel and respective one of said flanges.

16. The assembly set forth in claim 15 wherein each of said annular sealing means comprises a V-shaped seal of elastomeric construction and a garter spring urging one leg of each said V-shaped seal into sealing engagement with said shaft.

17. The assembly set forth in claim 13 wherein said at least one opening comprises a plurality of said openings circumferentially spaced around said shell.

* * * * *